United States Patent [19]
Wallace

[11] Patent Number: 5,618,022
[45] Date of Patent: Apr. 8, 1997

[54] VARIABLE ORIFICE VALVE

[76] Inventor: Glenn E. Wallace, 2063 S. Della La., Anaheim, Calif. 92802

[21] Appl. No.: 710,314

[22] Filed: Sep. 16, 1996

[51] Int. Cl.⁶ ............ F16K 31/122; F16K 47/00
[52] U.S. Cl. ............ 251/62; 91/31; 138/45; 251/63; 251/122; 405/52
[58] Field of Search ............ 91/31; 166/320; 251/62, 63, 120, 121, 122; 138/45, 46; 405/36, 52

[56] References Cited

U.S. PATENT DOCUMENTS

| | | | |
|---|---|---|---|
| 2,654,395 | 10/1953 | Kaye | 251/122 |
| 3,220,693 | 11/1965 | Dickson | 251/122 |
| 3,307,574 | 3/1967 | Anderson | 251/62 |
| 3,474,826 | 10/1969 | Breitsprecher et al. | 91/31 |
| 3,679,169 | 7/1972 | Bedo et al. | 251/122 |
| 3,761,053 | 9/1973 | Bedo et al. | 251/122 |
| 4,047,695 | 9/1977 | Cleveland et al. | 138/46 |
| 4,114,851 | 9/1978 | Shivak et al. | 251/122 |
| 4,215,844 | 8/1980 | Bowen | 91/31 |
| 4,280,569 | 7/1981 | Mount, II | 251/63 |
| 4,377,177 | 3/1983 | Claycomb | 251/122 |
| 4,576,358 | 3/1986 | Mott et al. | 251/62 |
| 4,647,004 | 3/1987 | Bihlmaier | 91/31 |
| 4,821,622 | 4/1989 | Burk | 91/31 |
| 4,869,460 | 9/1989 | Kocsanyi et al. | 251/62 |

*Primary Examiner*—George L. Walton

[57] ABSTRACT

The Variable Orifice Valve is disclosed and the preferred embodiment of a hydraulically acruated flow control device that permits the calibrated throttling of water used in a Artificial Storage and Recovery (ASR), Dedicated Recharge, Injection, Salt Water Barrier Wells used in aquifer storage or utilized in other industries where fluid flow control is required and desired. Aquifer storage of treated drinking water is the placement of water in aquifers during periods of surplus water for recovery of the water during peak demands or forming a barrier to protect a fresh water aquifer. This invention, when installed in a recharge well, is a device installed below the static water level and at or near the bottom of the drop pipe and near the top of the well screen. The size of the orifice and the liquid flow is varied by the axial positioning or adjustment of a double acting hydraulic actuator connected to valve piston. The axial position of the valve piston is controlled by a double acting hydraulic actuator completed through small stainless steel tubes to a hydraulic flow control valve and a hydraulic pump. The flow is monitored by using a flow meter and a pressure gage in the hydraulic passageway. The desired flow is set by adjusting the Variable Orifice Valve hydraulically while monitoring the flow. The operator may adjust the flow of water to any increment within the range of the valve.

4 Claims, 2 Drawing Sheets

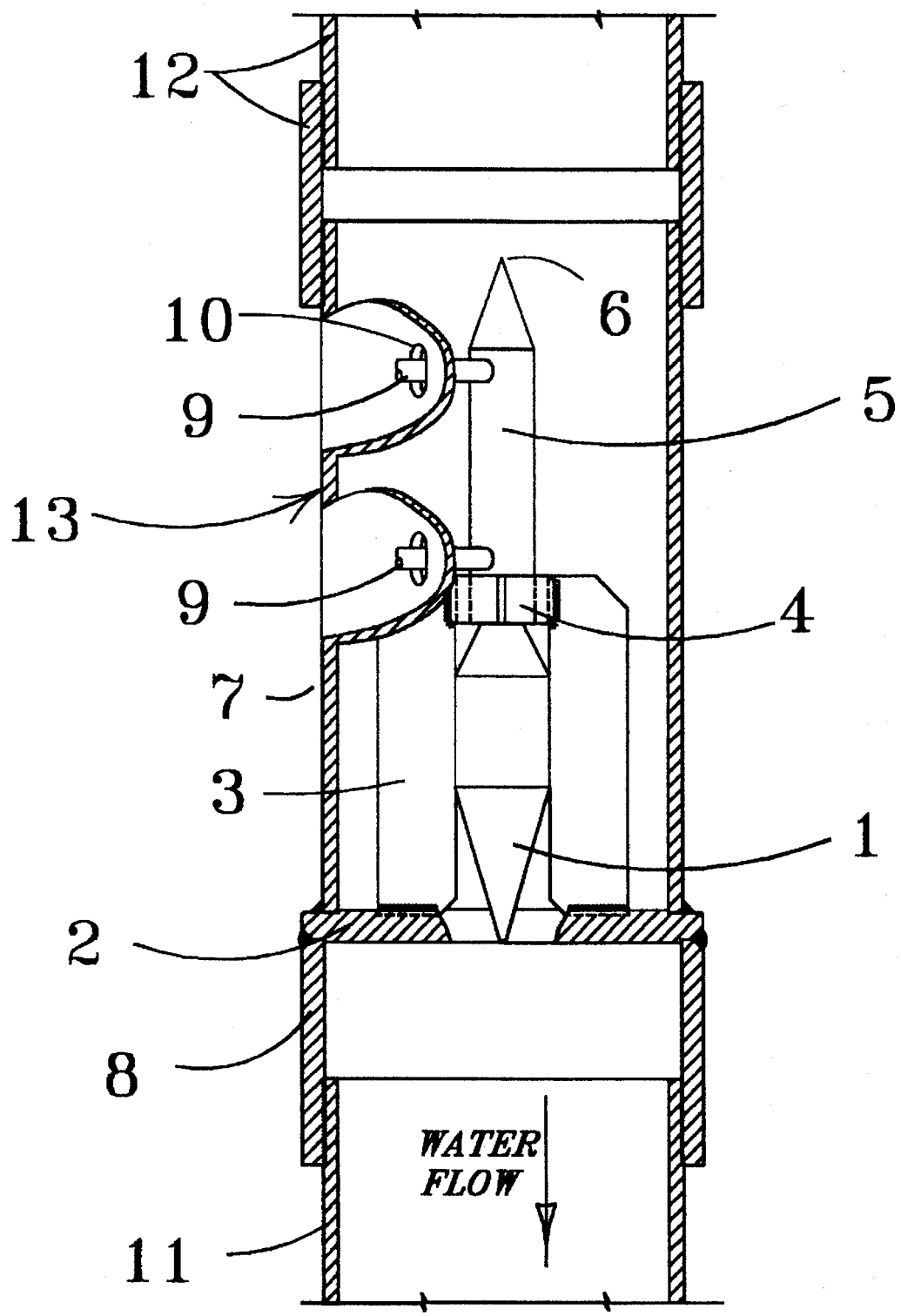
FIGURE #1

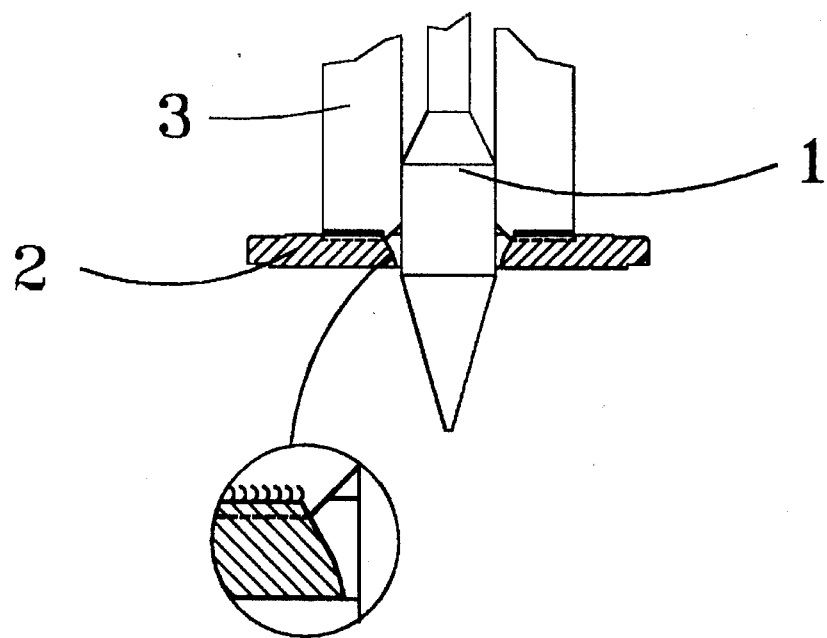
*FIGURE #2*
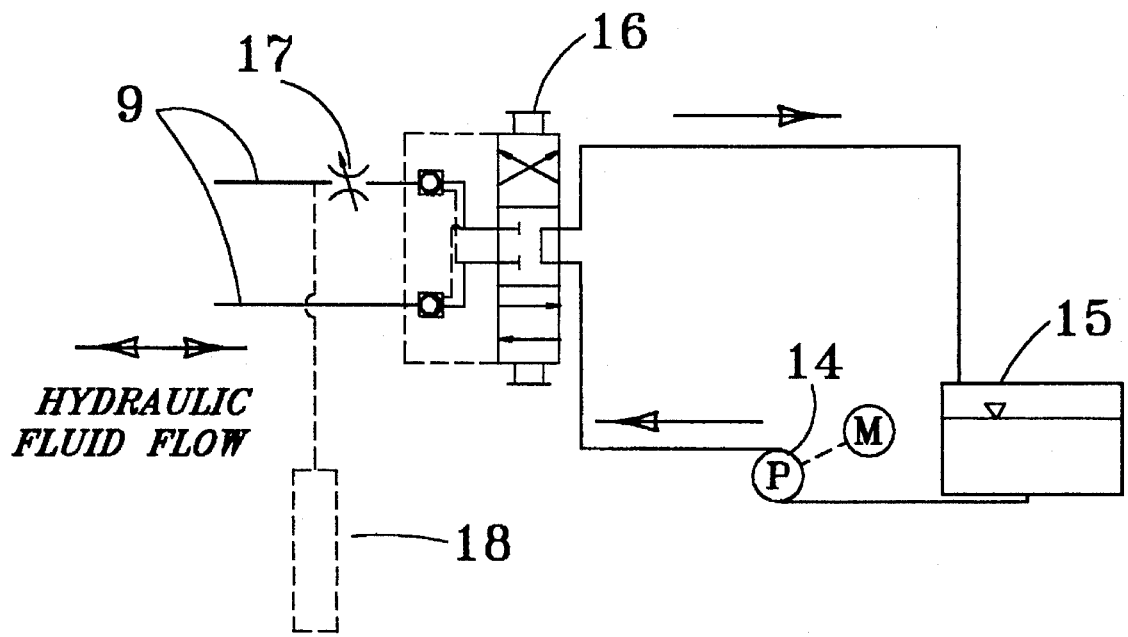
*FIGURE #3*

VARIABLE ORIFICE VALVE

BACKGROUND FIELD OF INVENTION

This disclosure relates to Aquifer Storage and Recovery (ASR), injection wells and salt water barrier wells involving water bearing aquifer(s) and flow control devices used in optimizing the rate of recharge or in other industries where the flow control of fluids is required or desired.

BACKGROUND OF INVENTION

The use of recharge, injection and salt water barrier wells to replenish ground water drives the need to replace water pumped out of the aquifer by production wells. The aquifer will accept recharge water at an increased or varying rates over the normal 5 year life of a well before refurbishing. The need for a flow control device in a down hole position nearly eliminates the possibility of air entrainment and the associated air-fouling, bio-fouling and calcite formation caused by this phenomenon. In some cases the entrained air will hydraulically shut down the well and result in the abandonment of the well.

This invention is the result of the determination that wells used for Water injection, Salt Water Barriers and in Aquifer Storage or Dedicated Recharge Wells for the storage or the protection of drinking water can and will require injection rates to be varied during the well's life span. This allows for optimization of the well's potential under changing background conditions.

In the arid western portions of the Unites States and in other parts of the world the natural recharge rates of aquifers are falling behind the water well production rates, the result is the gradual lowering of the static water levels in the aquifers. An aquifer is natures version of a water reservoir. Artificial recharge of aquifers is an activity that is an acceptable means of replacing or banking or storing the water in these aquifers. Recharge of an aquifer restores or exceeds the natural static water level of the aquifer. An artificial recharge, injection or salt water barrier well is essentially a production well, used in reverse, a means of placing water in the aquifer. Artificial recharge of groundwater aquifers is also done to bank or store extra water for summer months when peak demands are greater than the surface water infrastructure can supply. Typically, in this situation, the summer pumping and the recharge season is at different times of the year. In another case, salt water barrier wells are continuously in service, except for maintenance, and form a long mound or wall of water to prevent the salt water from flowing into the fresh water aquifer. Injection wells may be used in remediation of a contaminated aquifer, or improving the quality of water in an aquifer.

The recharge rate of the wells, indicated above, can be controlled by a single size orifice plate or pipe size for a set flow rat. If this rate is to high air entrainment may occur. The orifice plate is installed at or near the bottom of the injection piping and provides for flow control and a means to maintain the column pipe full of water, this sometimes eliminates cascading water and the associated air entrainment. Air entrainment, are bubbles formed by free falling water, like a water fall, which can result in air-fouling. The free falling water aerates the ground water and or forms bubbles that are forced into the sands of the aquifer by the recharge or injection water. The bubbles are carried into the aquifer by the recharge water and cling to the sand particles in the aquifer increasing the size of each particle grain. This action effectively and slowly closes off the permeability of the aquifer (air-fouling) as the size of the bubble around the sands increase in size, this action gradually reduces the flow, acting like a valve, shutting off water that is being recharged. In some cases the well has been rendered useless by this phenomenon.

The recharge rate is normally determined after the drilling of the well and provides a starting point for the estimated water recharge rate. In most cases the recharge rate may eventually need to be increased or decreased to optimize the recharge rate with the period of recharge to maximize or optimize the volume of water stored. To change the recharge rate in a typical recharge or injection well it has been necessary to pull the column pipe and change the pipe size or orifice plate. This is an expensive process costing $10,000 to $12,000 ('94$) and will take the well out of service. This disclosure reveals a device that eliminates the need to pull and replace the orifice plate to obtain a different flow rate.

This disclosure may be used in other applications requiring flow control of liquids, when precise, adjustments of the flow is required and desired.

SUMMARY OF THE INVENTION

The following is a more descriptive characterization of the preferred embodiment shown in FIG. 1. Incorporating operating principals and concepts of claimed flow control set forth by U.S. Pat. No. 5,503,363 to Wallace (1996). This invention is an improvement and is positioned in the liquid stream so that all working parts are up stream of the orifice, thereby isolating the component parts from cavitation. Cavitation may be generated by the fluid passing through the orifice and by the piston, this is a significant improvement over U.S. Pat. No. 5,503,363. Cavitation is a destructive process formed under certain conditions of high fluid velocities. Small bubbles are formed and in turn implode. When the implosion occurs near or at the surface of a material or metal microscopic portions are removed by the implosion. This action is a cutting action when the implosion occurs along a line or conical path. This invention positions the working parts up stream of the orifice plate and before the area where cavitation may occur. The orifice plate and piston are configured to force the water flow to the center of the water hydraulic passageway and to direct the cavitation away from the component parts and into the center of the hydraulic passageway.

This invention comprises a Variable Orifice Valve that permits calibrated throttling or flow adjustments from the well head and eliminates the process of pulling the drop pipe to change the flow rate. The flow through the valve is adjusted by axially positioning a tapered valving piston or a tapered shaped restrictive valving portion, or control device, in an orifice plate or circular opening. The axial position of the piston is selectively positioned by a hydraulic actuator. The hydraulic actuator is connected through two steel tubes to a hydraulic control valve, speed control valve, pump and hydraulic fluid reservoir at the well head. The desired flow is set or adjusted by monitoring a flow meter or flow monitoring means and hydraulically positions the valve piston using a hydraulic control valve at the hydraulic pump. To decrease the flow, the hydraulic control valve is moved to the close position and the valve piston is hydraulically moved axially and vertically towards the orifice plate, closing the valve. To increase the liquid flow, hydraulic fluid flow is reversed, by moving the hydraulic control valve to the open position, the valve piston is repositioned away from the orifice plate, opening the valve. Flow through the device can be made through incremental adjustments within the entire range of the valve.

The hydraulic fluid used to control this disclosure is controlled by a 3-position 4-way control valve acting in series with a speed control valve, an electrically driven pump, a reservoir, heat exchanger, connecting tubing and a double acting hydraulic actuator.

The Variable Orifice Valve is a fluid flow control device for maintaining a desired flow rate, comprising of a fluid passageway housing, an orifice plate having a circular opening therein is disposed within said fluid passageway housing and being secured thereto, a plurality of equally spaced guide mounting plates disposed within said passageway housing, said guide mounting plates having one end secured to the surface face of said mounting plate, control device disposed within passageway housing and movably guided between said guide mounting plates, said control device having tapered portions disposed at each end of said control device and an intermediate circular portion therebetween, one of the said ends having a tapered shaped restrictive valving portion and the intermediate portion having a circular valving portion for variably controlling a fluid flow rate through said circular opening by changing the size of said circular opening, as said tapered valving portion and said intermediate valving portion are moved through said circular opening, an adjustable hydraulic actuator is secured to the other end of said tapered ends within said fluid passageway housing, said hydraulic actuator having a portion secured to the other ends of said guide mounting plates, said hydraulic actuator adjustably controls the movement of said control device valving portions relative to said circular opening to permit a desired flow rate, where by the movement of said control device through said guide mounting plates minimizes flow turbulence through said circular opening; and means for adjusting the double acting hydraulic actuator for setting the desired flow rate to any increment within the range of the movement of said control device valving portions.

The previously recited guide mounting plates, serve as straightening vanes in the fluid passageway housing, said vanes act to stabilize the turbulent flow created by said control device valving portions and circular opening under certain flow conditions. The operating portions of the device are placed up stream from the orifice plate isolating the working parts from cavitation that may be generated under certain conditions.

The hydraulic flow control device as previously recited, in which said hydraulic piston is adjusted by a volume of hydraulic fluid through small diameter tubes, a three position, four way locking hydraulic valve and any one of a manual positioned valve or an electrically positioned valve, a speed control valve, an electrically driven hydraulic pump and reservoir, connected in series and being cooperatively associated with said hydraulic actuator for determining the desired flow rate of said control device valving portions relative to said circular opening a flow monitoring means being responsive to said flow rate within said fluid passageway housing.

BRIEF DESCRIPTION OF THE DRAWINGS

FIG. 1 is a sectional view of the of the invention, valve in the open position.

FIG. 2 is an enlarged sectional view and close up of the valve and the relationship of the piston and the orifice plate at the minimum flow condition or closed position.

FIG. 3 is a schematic of the hydraulic control systems used to set the flow rate of the Variable Orifice Valve.

DETAILED DESCRIPTION OF THE PREFERRED EMBODIMENT

Attention is first directed to FIG. 1, this illustrates the embodiment of this invention, A Variable Orifice Valve, FIG. 3 schematic illustrates the hydraulic system used as a control apparatus and hydraulic fluid power. This device, the Variable Orifice Valve is operated under positive hydraulic pressure. In the event of a loss of hydraulic fluid in one of the hydraulic lines the valve will remain in the last set position of fail safe position, in the event of loss of hydraulic fluid in both lines the valve will close. The hydraulic fluid is mineral oil, propylene glycol or other fluid that is not an environmental hazard, in the event of loss of hydraulic fluid. The Variable Orifice Valve is generally identified by number 13. To this end, the apparatus incorporates fluid lines 9 which delivers hydraulic fluid under pressure to the double acting hydraulic actuator 5 which moves the piston 1 towards the orifice plate 2 to reduce the flow through the valve. FIG. 2 shows the valve in the closed position. A unique feature of the valve is the water flow through the valve is never shut off completely nor can the piston 1 be forced into the orifice plate 2, which would result in a catastrophic failure. This possibility, is a most likely scenario with an inexperienced operator or an individual who is not paying attention to what they are doing while adjusting the flow rate. The design of the valve provides a clearance between the piston 1 and the orifice plate 2 to maintain a specified minimum flow. The valve may be adjusted within the design range by observing a flow monitoring means or flow meter, a part of the normal piping at the well head. The meter is also used to totalize and record the flow recharge water, a requirement by State Engineers in the Western United States. The initial flow rate is determined by a hydrologist from aquifer test data acquired from the well after the time of drilling. To operate the Variable Orifice Valve and decrease the fluid flow through the valve, the hydraulic control valve 16 is shifted from a lock position to a close position and pump 14 is operated taking fluid from the reservoir 15, forcing fluid through one of the lines 9 and returning through the other line 9 to the double acting hydraulic actuator 5, moving the piston 1 axially towards the orifice plate 2, reducing the size of the orifice plate 2 opening. To increase the flow through the Variable Orifice Valve 13, the hydraulic control valve 16, FIG. 3 is placed in an open position, the hydraulic fluid circulates through the lines 9 with hydraulic pressure to one of the lines and hydraulic fluid returned to the hydraulic storage tank 14 from the other line. Surge arrestor 18 may be utilized to dampen hydraulic surges in the hydraulic control fluid.

Due to the wet environment that this valve operates in, the piston 1 orifice plate 2, mounting plate 3, mounting bushing 4, hydraulic actuator 5 streamline tip 6, the hydraulic fluid passageway 7 and the threaded coupling 8 are made of highly corrosive resistant steel. The drop pipe 12 and coupling are supplied by the installer along with the tail pipe 11 and are made of materials normally used for column or drop pipes.

The orifice plate 2 and piston 1 are configured to force the water flow to the center of the water hydraulic passageway and to direct the cavitation away from the component parts and into the center of the hydraulic passageway.

I claim:

1. A hydraulic flow control device for controlling liquid flow, when precise linear adjustments of the flow is required and desired, comprising:

a hydraulic fluid passageway housing;

a plurality of working components including;
  a) an orifice plate having a circular opening therein is disposed within said fluid passageway housing and being secured thereto;
  b) a plurality of equally spaced guide mounting plates disposed within said passageway housing, said guide mounting plates having one end secured to the up stream surface face of said orifice plate;
  c) a hydraulic piston control device disposed within said passageway housing and moveable within said guide mounting plates said control device having tapered portions disposed at each end of said control device and an intermediate circular portion therebetween, one of said ends having a tapered shaped restrictive valving portion and the intermediate portion having a circular valving portion for variably controlling the fluid flow rate through said circular opening by changing the size of the said circular opening, as said tapered valving portion and said intermediate valving portion are moved through said opening;
  d) an adjustable double acting hydraulic actuator is secured to the other of said tapered ends within the fluid passageway housing, said hydraulic actuator having a portion secured to the other end of said guide mounting plates, said double acting hydraulic actuator controls the movement of said control device valving portions relative to said circular opening to permit a desired flow rate to be set where by the movement of said control device through said guide mounting plates minimizes the flow turbulence through said circular opening and;
a remotely located hydraulic means of adjusting the hydraulic actuator for setting the desired flow rate to any increment within the range of the movement of said control device valving portion, wherein the plurality of working components positioned upstream from said circular opening of said orifice plate, thus isolating the working components from the area where cavitation and turbulent flow may occur, that may be formed down stream of said orifice plate under certain flow conditions, to mitigate physical damage to the working components and hydraulic housing.

2. The hydraulic control device, as recited in claim 1, in which the guide mounting plates serve as straightening vanes in the fluid passageway housing, said vanes act to stabilize the turbulent flow created by said control device valving portions and circular opening during certain flow conditions.

3. The hydraulic flow device recited in claim 1, in which said double acting hydraulic actuator is adjusted by a volume of hydraulic fluid through two small diameter tubes, a three position four way, hydraulic, pilot operated locking valve, a speed control valve, reservoir and an electrically driven hydraulic pump, connected in series, and being cooperatively associated with said hydraulic actuator for determining the desired flow of said control device valving portions relative to said circular opening a flow monitoring means responsive to said flow rate within said fluid passageway housing.

4. The hydraulic flow device recited in claim 1, in which said orifice plate is mounted, is configured to force the water flow to the center of the hydraulic passageway and away from said hydraulic housing, in the event of cavitation, bubbles formed due to this phenomenon, are forced to said center of said hydraulic passageway and will implode within said hydraulic stream to prevent physical damage to said hydraulic housing and component parts of the device.

\* \* \* \* \*